(12) United States Patent
Cherunni

(10) Patent No.: US 10,931,507 B2
(45) Date of Patent: Feb. 23, 2021

(54) SYSTEMS AND METHODS FOR SELECTIVELY IMPLEMENTING SERVICES ON VIRTUAL MACHINES AND CONTAINERS

(71) Applicant: VMware, Inc, Palo Alto, CA (US)

(72) Inventor: Vinod Anthony Joseph Cherunni, Singapore (SG)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/452,303

(22) Filed: Jun. 25, 2019

(65) Prior Publication Data
US 2020/0412596 A1    Dec. 31, 2020

(51) Int. Cl.
*H04L 12/24* (2006.01)

(52) U.S. Cl.
CPC .............. *H04L 41/02* (2013.01); *H04L 41/04* (2013.01)

(58) Field of Classification Search
CPC ................................ H04L 41/02; H04L 41/04
USPC ......................................................... 709/223
See application file for complete search history.

(56) References Cited

U.S. PATENT DOCUMENTS

| 10,469,317 | B1* | 11/2019 | Jiang .................... H04L 12/4641 |
| 2018/0309646 | A1 | 10/2018 | Mustafiz |
| 2019/0129745 | A1* | 5/2019 | Wang ................... G06F 9/45558 |
| 2019/0173802 | A1 | 6/2019 | Xia |

FOREIGN PATENT DOCUMENTS

WO    WO2017181876    10/2017

OTHER PUBLICATIONS

International Search Report/Written Opinion PCT/US2020/039207 dated Oct. 12, 2020.

* cited by examiner

*Primary Examiner* — Nicholas R Taylor
*Assistant Examiner* — Chong G Kim
(74) *Attorney, Agent, or Firm* — Clayton, McKay & Bailey, PC

(57) ABSTRACT

Examples of the present disclosure can include a method. The method may include (1) identifying, by a virtual infrastructure manager ("VIM"), a virtual network function ("VNF") descriptor from information obtained from the integrated network, (2) selectively generating at least one container on the physical network based on the VNF descriptor, (3) determining, by the VIM, an integrated network requirement based on state information associated with the integrated network, (4) providing, by the VIM, to a container management platform, the integrated network requirement, and (5) causing a VNF to be generated in the container to fulfill the integrated network requirement. Corresponding systems, non-transitory computer-readable media, and methods are also disclosed.

20 Claims, 4 Drawing Sheets

SYSTEMS AND METHODS FOR SELECTIVELY IMPLEMENTING SERVICES ON VIRTUAL MACHINES AND CONTAINERS

BACKGROUND

Virtual network functions ("VNFs") can refer to network architectures that virtualize network node functions. VNFs can be connected to one another to create multi-part VNFs for network service chaining. Service chaining can refer to a sequence of network services (such as firewalls, network address translation, intrusion protection, etc.) that are connected in a virtual chain. VNFs can allow content service providers ("CSPs") to deploy complex network functions and services in distributed networks. The CSPs can model network topologies and construct network functions to include both virtual and physical network elements. A Telco network can be divided into slices for different tenants, each slice including a service chain of VNFs.

Network function virtualization orchestrators ("NFVOs") may use underlying virtual infrastructure managers ("VIMs") for implementing the VNF services according to service requirements. For example, a relatively complex VNF service may be constructed of a master VNF and multiple dependent VNFs. Such a VNF may have an instruction set that defines a descriptor such as a virtual VNF link descriptor ("VVLD") and a physical network function descriptor ("PNFD"). The VVLD and the PNFD may describe the virtual and physical network requirements for the VNF. The instruction set may conform with a service level agreement ("SLA") and can describe links to use or avoid in the physical network based on the descriptor. The SLA can govern performance requirements for various tenants. The orchestration may be critical to ensure the execution of appropriate SLAs for tenants and end users that subscribe to the VNF service. For instance, a virtual evolved packet core ("EPC") service may be allotted to a set of subscribers as part of a 5G network slice. An example SLA may describe that the total end-to-end latency for traffic flows within the various components of a corresponding multi-part VNF may not exceed about 10 milliseconds.

Multi-part VNFs can include VNFs that are made from microservices. These microservices may be deployed throughout the network and may have increased mobility as compared with other software modules on the network. In some cases, a network's scale-out requirements may cause a microservice to be re-deployed in a different cluster from the cluster in which it is originally deployed. This re-deployment may be due to resource constraints on the network. Further, a microservice may use independent network functions for a relatively short duration. Accordingly, functions can be processed and deployed externally to the originating microservice. Such external functions may need sustained communication with the microservice that caused the function to be created and deployed. The functions may be implemented on containers, an isolated user space in which computer programs run directly on the host operating system's kernel.

In some cases, conventional systems may not be able to adequately ensure that the microservices are created in the appropriate resource domains on a network. The resource domains may be based on the service requirements as specified by descriptors. Further, conventional systems may not be able to adequately provide the appropriate connectivity between the virtual and physical network domains. Moreover, conventional systems may not be able to adequately ensure the maintenance of appropriate SLAs between various VNFs that are part of the same multi-part VNF including both virtual machines ("VMs") and containers. Accordingly, conventional systems may not be able to manage both VM-based and container-based workloads for a single VNF and such systems may need to orchestrate the workloads separately. This separate orchestration of VM-based and container-based workloads for a single VNF may prevent the deployment of VNFs having subparts of each type. Accordingly, such an orchestrator may not be able to ensure SLA compliance of such a mixed VNF.

As a result, a need exists for orchestration that can implement selective implementation of services on VMs and containers.

SUMMARY

Examples described herein include systems and methods for managing an integrated network comprising a physical network and a virtual network. In one example, the system can include a non-transitory, computer-readable medium containing instructions and a processor that executes the instructions to perform stages. A VIM can decide which parts of a VNF are based on VMs and which parts are based on containerized-microservices. When the VNF subparts are distributed on the network, the VIM can manage the new container locations and VM locations. Managing both types of subparts can ensure SLA compliance when a VNF has both VM and containerized-microservice subparts.

One example of a VM can include a software simulation of a hardware platform that provides a virtual operating environment for guest operating systems. A VM can have its own operating system image, which can be independent from that of the host operating system or can be based on other VMs running on the same host. VMs may serve to improve the overall physical hardware utilization of a network. A virtualization layer, or hypervisor, can run the VMs and can abstract the hardware from the VM. This may allow for mobility and portability of VMs across hardware platforms. An example of a hypervisor can include a software program that runs on an actual host hardware platform and supervises the execution of the guest operating systems on the VMs.

The stages can include identifying, by a VIM, a VNF descriptor from information obtained from the integrated network. An example of an integrated network can include a combination of both a physical network and a virtualized network based on the physical network.

The stages can further include selectively generating at least one container on the physical network based on the VNF descriptor. The stages can include determining, by the VIM, an integrated network requirement based on state information associated with the integrated network. The stages can also include providing, by the VIM, to a container management platform, the integrated network requirement, and generating, by the container management platform, a VNF in the container to fulfill the integrated network requirement. In some examples, the VNF can include a first subordinate VNF that includes at least one microservice, and the stages can further include: generating a parent VNF on the integrated network, the parent VNF including the first subordinate VNF. The stages can also include causing a second subordinate VNF including a virtual machine to be generated on the parent VNF based on the VNF descriptor to fulfill the integrated network requirement. The stages can further include generating, based on the VNF descriptor, a VM to fulfill the integrated network requirement.

In some examples, the container management platform can generate at least one microservice based on an occurrence of a predetermined event defined by the VNF descriptor. The events can refer to actions or occurrences recognized by software, which may originate asynchronously from the external environment, that may be handled by the software. The policy and mediation engine may instantiate such microservices by the VIM based on certain triggers defined by the VNF descriptors. The generation of the VNF can include determining at least one of a VNF placement (for example, installation and configuration), an addition of other VNFs, or a VNF teardown. The disclosed systems may perform additional activities as part of the generation of the VNF, including providing VNF scaling based on dynamic requirements from the network, monitoring and analyzing VNFs for errors, capacity management, and performance, and upgrading and updating VNFs for applying new releases and patches.

The state information can be associated with two or more containers having a common internet protocol ("IP") address or a common medium access control ("MAC") address. The VIM can include an application programming interface ("API") configured to receive an integrated network service request. The disclosed systems can determine, by the VIM, the integrated network requirement based on the integrated network service request. The VIM can identify and store data describing at least one of a VNF location on the integrated network or a VNF resource consumption on the integrated network. The VIM can implement a policy defined by at least one of a VVLD, a virtual network function descriptor ("VNFD"), or a PNFD. The VNDF may represent a file that describes the instantiation parameters and operational behaviors of the VNFs.

These stages can be performed by a system in some examples. Alternatively, a non-transitory, computer-readable medium including instructions can cause a processor to perform the stages when the processor executes the instructions.

Both the foregoing general description and the following detailed description are example and explanatory only and are not restrictive of the examples, as claimed.

DESCRIPTION OF THE EXAMPLES

Figure 1:
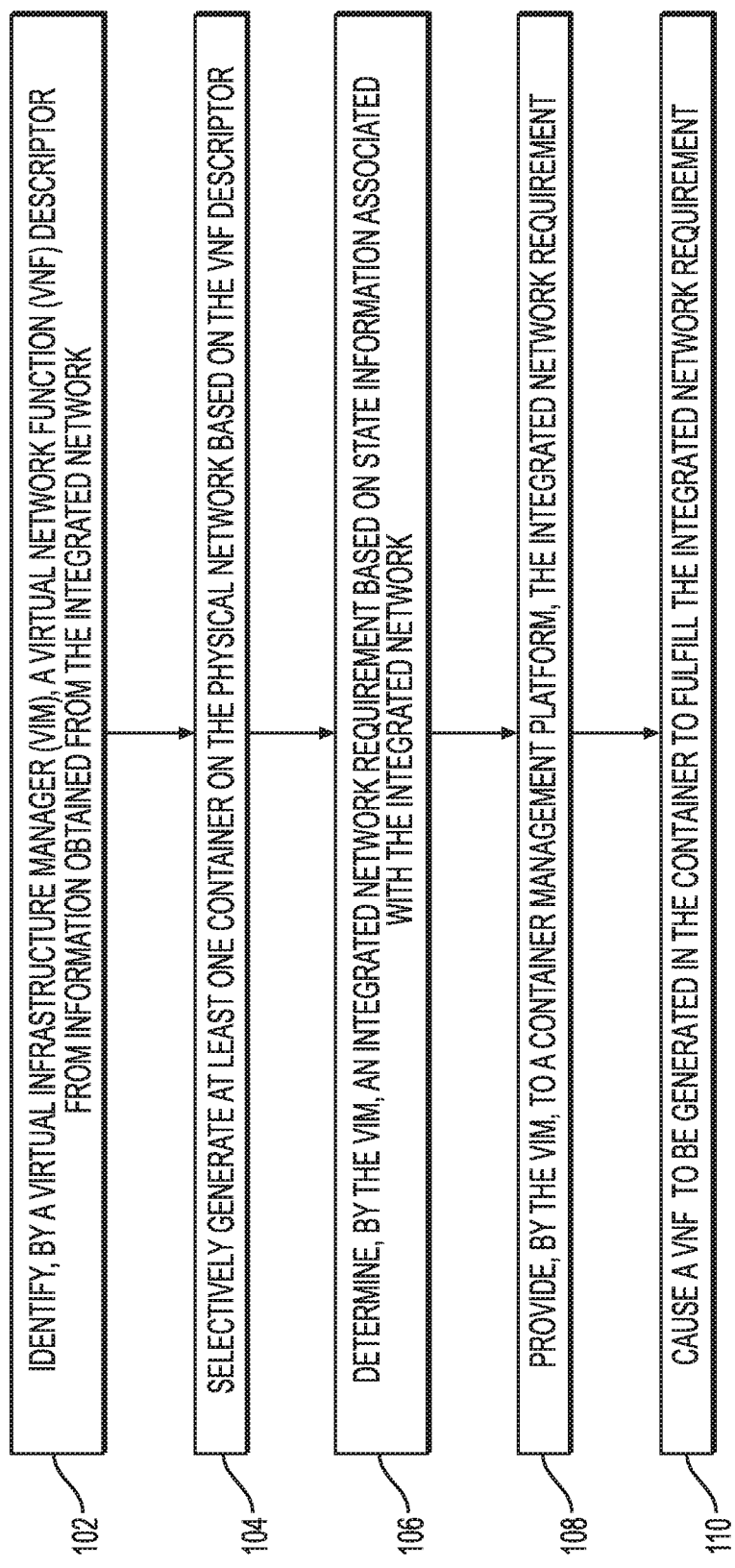
FIG. 1 is a flowchart of an example method for selectively implementing services on VMs and containers.

Reference will now be made in detail to the present examples, including examples illustrated in the accompanying drawings. Wherever possible, the same reference numbers will be used throughout the drawings to refer to the same or like parts.

Multi-part VNFs can include VNFs that are made from microservices. These microservices may be deployed throughout the network and may have increased mobility as compared with other software modules on the network. An example of a microservice can include a software development technique that structures an application as a collection of loosely coupled services. In a microservices architecture, services are fine-grained and the protocols are lightweight. In some cases, a network's scale-out requirements may cause a microservice to be re-deployed in a different cluster from the cluster in which it is originally deployed. This re-deployment may be due to resource constraints on the network. Further, a microservice may use independent network functions for a relatively short duration. Accordingly, functions can be processed and deployed externally to the originating microservice. Such external functions may need sustained communication with the microservice that caused the function to be created and deployed. The functions may be implemented on containers, an isolated user space in which computer programs run directly on the host operating system.

As noted, conventional systems may not be able to adequately ensure that NFVs and microservices are created in the appropriate resource domains. Further, conventional systems may not be able to adequately provide the appropriate connectivity between the virtual and physical network domains. Moreover, conventional systems may not be able to adequately ensure the maintenance of appropriate SLAs between VNFs that are part of the same multi-part VNF associated with both VMs and containers. An example of SLA can include a contract between a service provider and a tenant (also called an end user) that defines the level of service expected from the service provider. SLAs can be output-based in that their purpose is specifically to define what the end user can receive. For instance, an SLA can define performance characteristics of a network sliced being leased to a tenant. The SLA can specify VNF performance thresholds for one or more VNFs in a service chain for the slice.

An example of a service chain can include a collection of connected network services (for example, firewalls, network address translation, intrusion protection, etc.) that can be connected in a virtual chain. Service chains can be used to set up suites or catalogs of connected services that enable the use of a single network connection for many services having different characteristics.

As noted, microservices may be orchestrated and managed by a separate platform which is distinct from a VIM platform. The separate platform may include a container management platform. The container management platform may be implemented using Kubernetes, while the VIM may be implemented using Openstack. In some cases, there may be network architectures where the container management platform is overlaid on the VIM. As used herein, a "VIM" in a NFV implementation can manage the hardware and software resources that the service provider uses to create service chains and deliver network services to users. Among other functions, the VIM can manage the allocation, upgrade, release, and reclamation of NFV infrastructure resources and optimize their use.

Kubernetes can include an open-source container orchestration system for automating application deployment, scaling, and management. Kubernetes can provide a platform for automating deployment, scaling, and operations of application containers across clusters of hosts. A pod in Kubernetes can include a scheduling unit. The pod can add a higher level of abstraction by grouping containerized components. A pod can include containers that can be co-located on the host machine and can share resources. Each pod in Kubernetes can be assigned a unique pod IP address within the cluster, which can allow applications to use ports without the risk of conflict. Within the pod, the containers can reference each other on a local host, but a container within one pod may not directly address another container within another pod. Instead the container may use the pod IP Address. Openstack can include an open-source cloud operating system that automates the management of the compute, storage, and networking components of a cloud environment.

Conventional systems may use an orchestrator distinguish between which VNFs to be directed towards the container management platform or the VIM. The orchestrator may include a network functions virtualization ("NFV") management and orchestrator ("MANO"). An example of network functions virtualization management and network orchestration ("NFV MANO") can refer to a framework developed by a working group of the same name within the European Telecommunications Standards Institute ("ETSI") for NFV. The NFV MANO can include the ETSI-defined framework for the management and orchestration of all resources in a virtualized data center including compute, networking, storage, and VM resources.

For example, the MANO may orchestrate the container management platform based using two different VIMs, each VIM having control for the respective container domains. However, VNF vendors may have limited experience with containers and microservice systems. Accordingly, such VNF vendors may host certain functions as VMs and can host a few functions as microservices within containers. Therefore, conventional systems may not be able to adequately ensure the maintenance of appropriate SLAs between various VNFs that are part of the same multi-part VNF including both VMs and containers.

The disclosed systems are directed to using the VIM as an access and control point for the MANO. In some examples, the VIM may be implemented using any suitable implementation including Openstack. The MANO may transmit network infrastructure requirements to the VIM. Further, the VIM may identify descriptors associated with the VNF. An example of a descriptor can include a template that describes aspects of the deployment and operational behavior of a virtual or an underlying physical network. Some example descriptors include a VVLD and a PNFD. A VVLD can describe virtual link requirements for connecting one or more VNFs together. The PNFD can refer to a deployment template which describes a physical network function in terms of deployment and operational behavior requirements and can also contain connectivity, interface, and resource requirements. A "descriptor" and "VNF descriptor" may be used interchangeably herein.

Based on the descriptors, the VIM may transmit a workload creation request to the container management platform. In some examples, for containers residing on bare-metal servers, the container management platform may include a Kubernetes-based container management platform. Baremetal servers may represent physical servers, where a distinct physical piece of hardware serves as a functional server on its own. Alternatively, a workload creation request may be locally fulfilled by the VIM. For example, the VIM can create a corresponding VM to fulfill the workload request.

Containerization can include an operating system feature in which a kernel allows the existence of multiple isolated user-space instances. Such instances, called containers, partitions, virtual environments, and the like, may operate similar to real computers from the point of view of programs running in the instances. A computer program running on an ordinary operating system can see the resources (connected devices, files and folders, network shares, processing power, quantifiable hardware capabilities, and the like) of that computer. However, programs running inside a container may only see the container's contents and devices assigned to the container.

Containers may refer to forms of virtualization at operating system level. Containers may represent an emerging VNF option that allows networks to run more VNFs on a single physical host server. Containers may not include their own operating system but can depend more heavily on the host OS. Containers can encapsulate application dependencies, required libraries, and configuration in a package which is isolated from other containers in the same operating system. Further, VNF microservices can be deployed in containers which enable the continuous delivery and deployment of larger and more complex applications.

Containers can be used along with virtual machines in NFV environments. The deployment of VNFs can be virtual machine only, containers only, or hybrid. In the hybrid mode, the container may run in VMs providing security and isolation features. The containers may also be run in a heterogeneous mode where some of VNFs will run in VM, some in containers and mix of both. Having a container in place to host microservices can allow active schedule and management to optimize resource utilization. A container orchestration engine can enable the provisioning of hosts resources to containers, the assignment of containers to hosts, and the instantiation and rescheduling of containers.

Containerized microservices may have the ability to orchestrate the containers so that separate lifecycle management processes can be applied to each service. This allows for each service to be versioned and upgraded singularly as opposed to upgrading the entire VNF in VM. For example, while upgrading a whole application or VNF, a container scheduler can determine which individual services have changed and deploys only those specific services.

The VIM may instantiate a container by maintaining state information regarding the containers and pods, related IP and MAC information, and node information. The VIM may identify, during workload creation, corresponding resource requirements for executing the workload based on descriptors of the VNF. In some examples, the VIM may perform resource identification prior to making corresponding API calls to the container management platform. The VIM may communicate the state information to the container management platform to make decisions regarding VNF placement, scale-out, and tear-down. Further, the VIM may include a policy and mediation engine to intercept northbound requests from the MANO. The northbound requests may refer to requests for a particular component of a network to communicate with a higher-level component. The policy and mediation engine may convert policy and service requests from the network to instructions that may be communicated to related systems in the chain (for example, to the container management platform).

The policy and mediation engine may provide a single interface and API for deconstructing service requests. Further, the VIM may be configured to handle policy-driven (for example, SLA-based) attributes defined in descriptions (for example, VVLDs, VNFDs, and PNFDs).

The policy and mediation engine may further serve to maintain information about the VNF within a service chain. The information may pertain to the VNF's location, resource consumption, and other attributes which may be defined by the MANO. The policy and mediation engine may maintain information specific to additional artifacts, such as microservice bursts that may be created based on specific events. The events can refer to actions or occurrences recognized by software, which may originate asynchronously from the external environment, that may be handled by the software. The policy and mediation engine may instantiate such microservices by the VIM based on certain triggers defined by the descriptors. It is to be understood that embodiments of the disclosure are not constrained by the virtual switching infrastructure implementation within the container management platform.

The disclosed embodiments may serve to automate the orchestration and management of network, storage, and compute resources in NFV and SDN environments. The automation be applied, for example, in situations where the NFVs manage increased combination of elements. For example, one physical server can have ten VMs or hundreds of containers. It may become increasingly difficult for a network administrator to manage NFVs at such a scale. The associated services may include fulfillment, installation, and configuration to monitoring, optimization, add/drop/changes, and fault isolation. Automation and orchestration can facilitate programmatically controlling, monitoring, and repairing or replacing networking components without direct human involvement. With automation, the disclosed systems can spin up or destroy VNFs (as VMs or containers) to elastically scale network functions to match dynamic demand.

One example of NFV can include an overarching concept of running software-defined network functions, independent of specific hardware platforms, as well as to a formal network virtualization initiative led by various telecommunications network operators.

VNFs can include virtualized tasks formerly carried out by proprietary, dedicated hardware. In contrast to an NFV which represents the overarching concept, a VNF can refer to the building block of the tasks within ETSI's current NFV framework. VNFs can move individual network functions out of dedicated hardware devices into software that runs on commodity hardware. These tasks can be used by both network service providers and businesses. The tasks can include, but are not limited to, firewalls, domain name system, caching or network address translation and can run as VMs. A VNF, on the other hand, can refer to the implementation of a network function using software that is decoupled from the underlying hardware.

An NFVO can refer to a component of the NFV MANO architectural framework, which helps standardize the functions of virtual networking to increase interoperability of software-defined networking ("SDN") elements. The NFVO can perform resource orchestration and network service orchestration, as well as other functions.

FIG. 1 is a flowchart of an example method 100 for selectively implementing services on VMs and containers. At stage 102, the method may include identifying, by a VIM, a VNF descriptor from information obtained from the integrated network. As noted, descriptors may be templates that describe the deployment and operational behavior of a virtual or physical network. The ETSI framework defines attributes that may be part of the VNF based on different applications and use cases (for example, 5G applications, mobile at compute use cases, and the like). Further, the VNFs can fulfill relatively complex requirements. A given VNF can serve as a master VNF and have various subordinate VNFs. Both the master and subordinate VNFs can have a corresponding set of requirements and attributes. Such requirements and attributes can be based on a SLA to an end user and may be defined within a template and called descriptors.

A given VNF may have a corresponding VNF manager, a software module that may perform various functions on behalf of the VNF. For example, the VNF manager can upgrade the software associated with the VNF, can ensure that appropriate attributes are communicated to the appropriate layer in the stack based on the VNF's needs, and the like. The VNF manager can be in communication with and be proximate to the MANO. The VNF manager may communicate the VNF's service attributes to the MANO to perform and adhere to a given SLA.

The MANO may identify the attributes and may generate a descriptor based on a template including attributes pertaining to the VNF. The MANO may transmit the descriptor to the VIM including the attributes that can encompass the needs, requirements, and conditions under which the VNF can perform. For instance, the descriptor may include a rule stating if the VNF is 90% utilized, the VIM may need to create three more instances of the VNF in predetermined nodes on the physical network. These additional attributes may be embedded within the template and passed down to the VIM.

At stage 104, the method may include selectively generating at least one container based on the VNF descriptor. Further, the disclosed systems may configure the VIM to handle policy-driven (for example, SLA-based) attributes defined in the descriptors (for example, VVLDs, VNFDs, and PNFDs). The disclosed systems may configure the VIM to maintain information specific to additional artifacts, such as event-driven microservices. The VIM may instantiate such microservices based on certain triggers defined by the descriptors. Accordingly, a microservice can publish an event whenever the microservice updates its data. Other microservice can subscribe to events. When an event is received, a microservice can update its data. For example, a microservice can publish an event when something notable occurs on the network, such as when the microservice updates a business entity. Other microservices can subscribe to those events. When a microservice detects an event, the microservice can update its own business entities, which might lead to more events being published.

At stage 106, the method may include determining, by the VIM, an integrated network requirement based on state information associated with the integrated network. In some examples, the state information can be associated with containers having a common IP or MAC address, or other suitable identifier. The IP address may refer to a numerical label assigned to a device connected to a computer network that uses the Internet protocol for communication. The MAC address may refer to a unique identifier assigned to a network interface controller associated with a device on the network.

In some examples, the VIM can include an API configured to receive an integrated network service request. The disclosed systems may then determine, by the VIM, the integrated network requirement based on the integrated network service request. The VIM may further identify and store data describing at least one of a VNF location on the integrated network or a VNF resource consumption on the integrated network.

At stage 108, the method may include providing, by the VIM, to a container management platform, the integrated network requirement. The VIM may transmit information over the network that corresponds to the integrated network requirement. The information may be encapsulated with any suitable headers. This may facilitate the transmission of the information through different entities such as different cloud providers, routers, and the like without incurring additional delays.

The VIM may implement a policy defined by a descriptor. As noted, the descriptor may include a VVLD, a VNFD, a PNFD, and the like. In some examples, the disclosed systems may configure the VIM to generate a virtual machine to fulfill the integrated network requirement based on the VNF descriptor. In other examples, the disclosed systems may configure the container management platform to generate a microservice based on an occurrence of a predetermined event defined by the VNF descriptor.

At stage 110, the method may include causing a VNF to be generated in the container to fulfill the integrated network requirement. The generation of the VNF may include determining at least one of a VNF placement, an addition of other VNFs, or a VNF teardown. VNF placement may refer to the deployment of the VNF, implementation of necessary connections, and making the VNF functional. Further, the container management platform may automatically detect all VNF failures and ensure that they are restarted so that there are no silent failures.

The disclosed systems can determine the availability and features of the physical platform resources and generate an optimized map of resource locations. The disclosed systems can specify both where VNFs should be instantiated and also the required connections between VNFs that are necessary to achieve an overall customer-facing service. The container management platform can record the results of VNF deployments to permit management views of the actual resource assignments.

Figure 2:
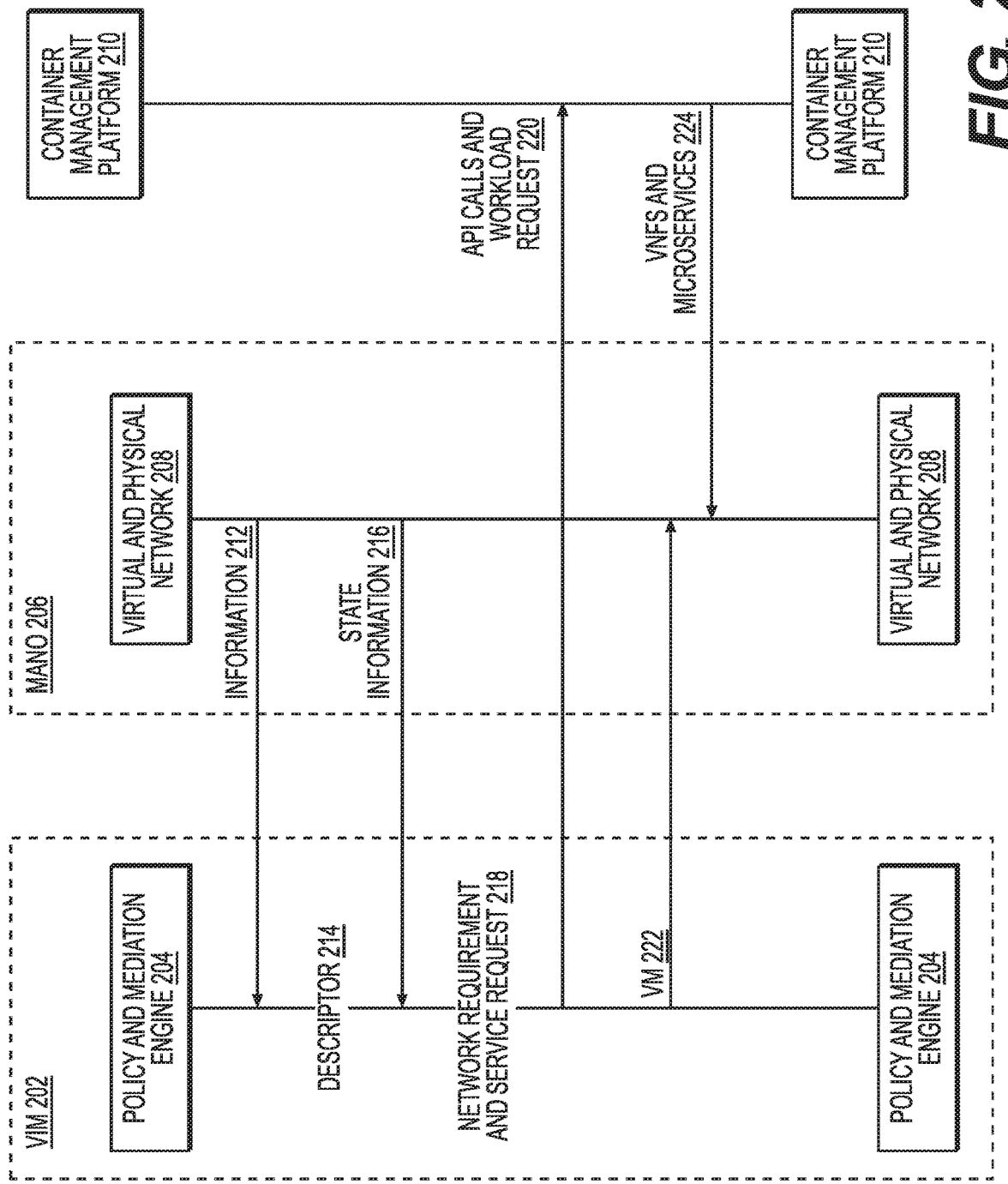
FIG. 2 an example sequence diagram of example stages for communications between integrated network components to selectively implement services on the network.

FIG. 2 an example sequence diagram of example stages for communications between integrated network components to selectively implement services on the network. This example sequence diagram shows a VIM 202 including a policy and mediation engine 204, a MANO 206 that supervises virtual and physical networks 208, and a container management platform 210.

At stage 212, the virtual and physical networks 208 may transmit information to the policy and mediation engine 204. The information may include a descriptor or similar information. The descriptor may include operational behavior requirements and may also contain connectivity, interface, and resource requirements for the network.

At stage 214, the policy and mediation engine 204 may identify a descriptor based on information. The policy and mediation engine 204 may, for example, parse the information and identify the descriptor using header data embedded in the information. In other examples, the disclosed systems may identify a file containing configuration information that serves as the descriptor.

At stage 216, the virtual and physical networks 208 may also transmit state information to the policy and mediation engine 204. In some examples, the state information may include the current memory contents and the information that defines and identifies a virtual machine. Other examples of state information associated with a virtual machine can include, but not be limited to, a hardware compatibility associated with the virtual machine, the number of processors and amount of memory that a virtual machine uses, a workload associated with the virtual machine, a hypervisor version or type information, and the like. The defining and identification information stored in the state includes all the data that maps to the virtual machine hardware elements, such as the basic input/output system (BIOS), devices, processors, MAC addresses for associated Ethernet cards, chip set states, registers, and the like.

At stage 218, the policy and mediation engine 204 may determine a network requirement or service request. The network requirement may include compute and storage resources. The network requirement may further include network address assignments, ports for wide-area network ("WAN") connections, local connections, standard management connections, and the like. Non-limiting examples of service requests may include requests associated with security, quality of service ("QoS"), and address management (for example, dynamic host configuration protocol ("DHCP") and domain name system ("DNS")).

At stage 220, the policy and mediation engine 204 may transmit API calls and a workload request to the container management platform 210. The API call may refer to requests by the policy and mediation engine 204 in name of an application or similar service that is using the API. Non-limiting examples of API calls may include login, save, and query operations. A workload may refer to specified tasks attributed to a defined computing block at any period in time. Further, the workload may include computing tasks that exist with a discrete, isolated, and detached set of application logic with specific policies, rules and behavioral characteristics. The tasks can be executed independently and autonomously of a specific parent or related application so that a specific computing function can be carried out.

At stage 222, the policy and mediation engine 204 may generate a VM on the virtual and physical networks 208. The VM may represent a portion of a VNF, such as a subordinate VNF, and execute some or all of the functionality required for the VNF. The policy and mediation engine 204 may instantiate a VM on the virtual and physical networks 208 by binding abstract requirements for resources (such as memory, processing, and networking resources) expressed in a VM template to concrete instances of appropriate resources. The resource may include a target collection of compute, memory, and storage resources on the virtual and physical networks 208.

At stage 224, the container management platform 210 may deploy microservices to the virtual and physical networks 208. Accordingly, the container management platform 210 can enable another VNF or portion of the VNF to be carried out by a containerized microservice. As noted, the VNF can have subordinate VNFs, some of which are VMs and some of which are containerized microservices. Further, the policy and mediation engine 204 or the container management platform 210 can deploy the subordinate VNFs accordingly. In some examples, the microservices can simplify relatively large, complicated software systems by breaking them into sub-components and distributing them across many computing servers or in the cloud. The deployment of the microservices can allow applications to be managed and coordinated over a large virtualized infrastructure.

Figure 3:
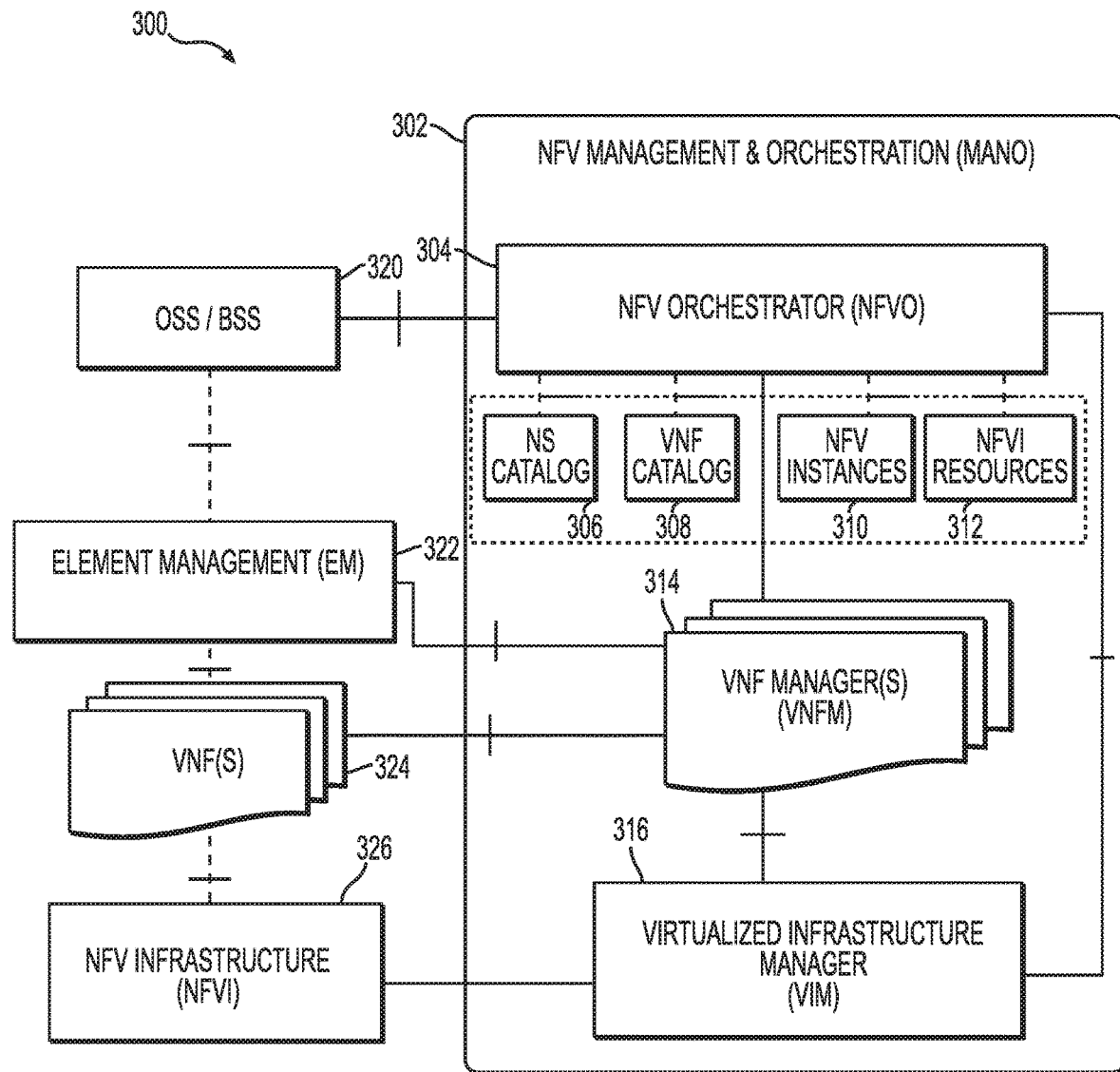
FIG. 3 is an example system diagram for managing the integrated network.

FIG. 3 is an illustration of an exemplary system for managing an integrated network comprising a physical network and a virtual network. A conventional network may need one management system (for example, an NMS) and may be supported by an operations support system ("OSS"). A NFV network, in contrast, may need multiple managers, for example, a VIM manager, a virtual network function manager ("VNFM"), and an orchestrator.

Diagram 300 represents a network architecture schematic. ETSI may refer to a standards body that provides definitions related to the architecture and framework of NFV. The MANO 302 may include a VIM 316, a VNFM 314, and a NFVO 304. Diagram 300 further shows an element management ("EM") 322 and an OSS/business support system ("BSS") 320. The EM 322 and the OSS/BSS 320 may not be directly part of the MANO 302. However, the EM 322 and the OSS/BSS 320 may exchange information with the MANO 302.

In some respects, the VIM 316 may manage the NFV infrastructure's ("NFVI") 326 resources. NFVI 326 may include physical resources (server, storage, and/or the like), the virtual resources (for example, VMs) and software resources (for example, hypervisors) in an NFV environment. In some examples, the NFV architecture may include multiple VIMs, each VIM managing its respective NFVI domain.

The VIM 316 may manage the life cycle of virtual resources in an NFVI 326 domain. In particular, the VIM 316 may create, maintain, and tear down VMs from physical resources in an NFVI 326 domain. The VIM 316 may keep inventory of VMs associated with physical resources. The VIM 316 may manage the performance and faults associated with hardware, software, and virtual resources. In some examples, the VIM 316 may maintain application program interfaces ("APIs") and expose physical and virtual resources to other management systems.

The VNFM 314 may manage VNFs 324, that is, the virtualized network elements such as router VNFs, switch VNFs, etc. In some examples, the VNFM 314 may manage the life cycle of the VNFs 324. For example, the VNFM 314 may create, maintain and terminate VNF 324 instances that may be installed on the VMs and which the VIM 316 may create and manage.

The VNFM 314 may provide for the fault, configuration, accounting, performance and security ("FCAPS") management of the VNFs 324. Moreover, the VNFM 314 may scale up or scale down the VNFs 324 which may result in scaling up and scaling down of corresponding resource usage (for example, CPU usage). In some examples, there may be multiple VNFMs 314 managing separate VNFs 324 or there may be one VNFM 314 managing multiple VNFs 324.

As noted, there may be multiple VIMs 316 managing respective NFVI 326 domains. Accordingly, a NFVO 304 can serve to manage and coordinate the resources from different VIMs 316, when there are multiple VIMs 316 in same or different network location. The NFVO 304 may perform resource orchestration whereby the NFVO 304 coordinates, authorizes, releases, and engages NFVI resources among different points of presence ("PoPs") or within one PoP. A PoP may refer to an artificial demarcation point or interface point between communicating entities. The NFVO 304 may perform the resource orchestration by engaging with the VIMs 316 directly through their APIs instead of engaging with the NFVI resources directly.

Also as noted, there may be multiple VNFMs 314 managing their respective VNFs 324. Accordingly, the NFVO 304 may manage and coordinate the creation of an end-to-end service that involves VNFs 324 from different VNFMs 314 domains. The NFVO 304 may perform service orchestration to create the end-to-end service among different VNFs 324 that may be managed by different VNFMs 314. The NFVO 304 may perform service orchestration by coordinating with the respective VNFMs 314 so the NFVO 304 does not need to talk to the VNFs 324 directly. For example, the NFVO 304 may create a service between the base station VNFs 324 of one vendor and the core node VNFs 324 of another vendor. The NFVO 304 may perform service orchestration to instantiate VNFMs 314, where applicable. The NFVO 304 may perform topology management of network services instances which may also be referred to as VNF 324 forwarding graphs. The NFVO 304 may serve to bind together different functions of the VNF 324 and creates an end-to-end service in addition to performing resource coordination in an otherwise dispersed NFV environment.

Diagram 300 further shows various repositories (for example, files and lists) that hold different information in the MANO 302. The repositories may include a VNF catalog 308 that includes a repository of all usable VNFDs. A VNFD may refer to a deployment template which describes a VNF in terms of its deployment and operational behavior requirements. The VNFDs may be used by the VNFM 314 in the process of VNF 324 instantiation and lifecycle management of VNF 324 instances. The NFVO 304 may also use the information provided in the VNFDs to manage and orchestrate network services and virtualized resources on the NFVI 326.

The repositories may include network services ("NS") catalog 306 that may include a catalog of the usable network services. The NS catalog 306 may store a deployment template for a network service in terms of VNFs 324 and description of their connectivity through virtual links. The repositories may include NFV instances 310 which may hold the details about network services instances and related VNF instances. The repositories may include NFVI resources 312 that may list the resources that can be to establish NFV services.

As noted, the EM 322 and the OSS/BBS 320 management systems may not be part of the MANO 302 but may exchange information with MANO 302. The EM 322 may provide FCAPs for the VNF 324. The VNFM 314 may also provide similar services of the VNF 324 for the virtual part of the VNF 324.

For example, the MANO 302 may generally be responsible for managing the changes between the virtual and physical world. The VNFM 314 may perform life cycle management and FCAPS for the VNF 324. For instance, if there is an issue with the spinning up of a VNF 324, the issue may be reported by the VNFM 314. However, if the fault is related to a function, the fault may be highlighted by the EM 322.

The OSS/BSS 320 may include collection of systems and applications that a service provider uses to operate its business. The VNF 324 may work in coordination with the OSS/BSS 320. The disclosed systems may extend the functionalities of the OSS/BSS 320 to manage the VNFs 324 and the NFVI 326 directly. The OSS/BBS 320 may extend the functionality of the MANO 320 by offering additional functions if they are not supported by a certain implementation of MANO 320.

Figure 4:
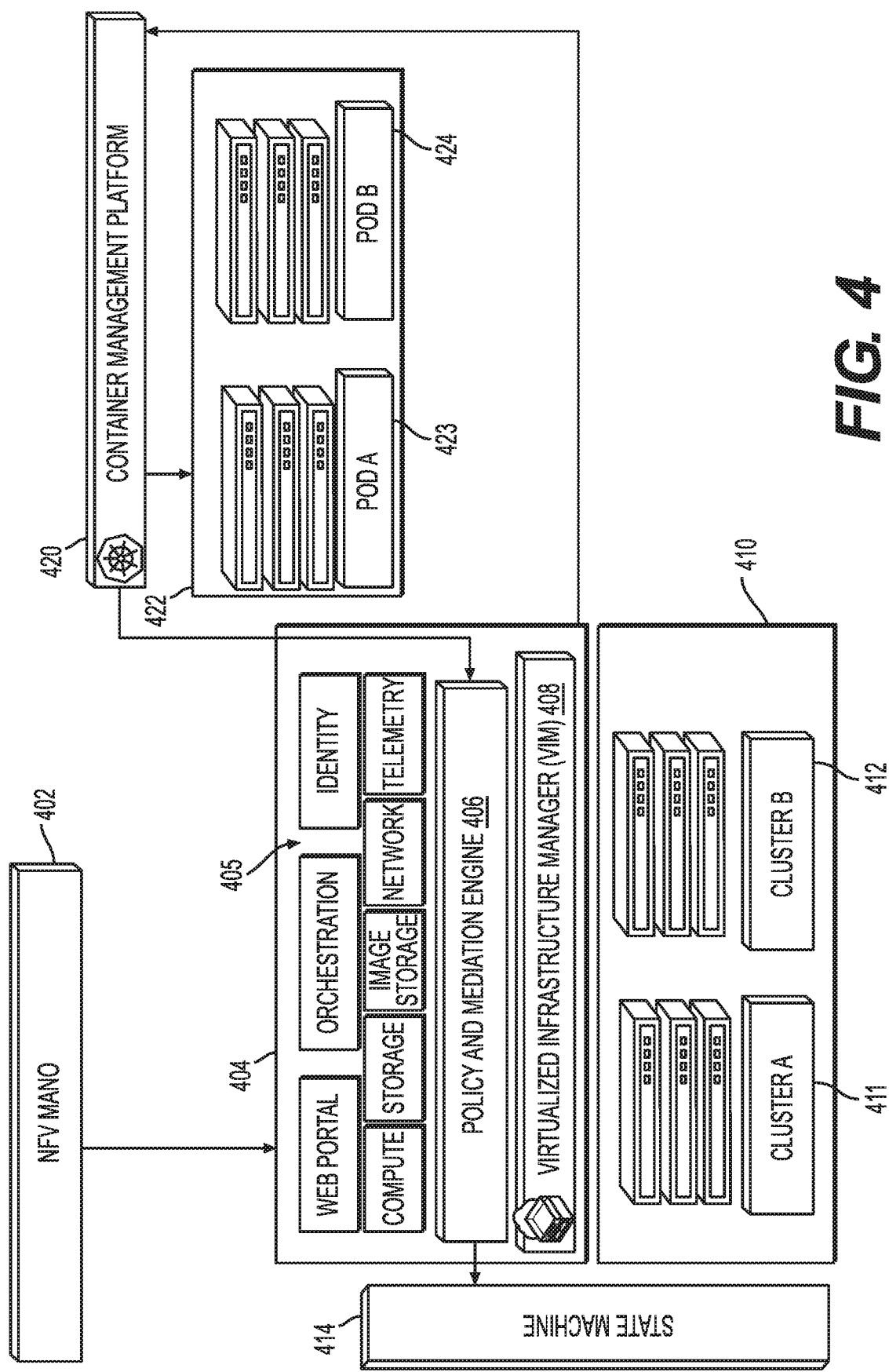
FIG. 4 is an illustration of an example schematic representing communications between an orchestration platform, a VIM, and a container management platform for selectively implementing services on VMs and containers on an integrated network.

FIG. 4 is an illustration of an example schematic representing communications between an orchestration platform, a VIM, and a container management platform for selectively implementing services on VMs and containers on an integrated network. The policy and mediation engine 406 may be a part of the VIM 408. In addition to using a virtualized set of resources to create work flows and VNFs, the policy and mediation engine 406 may serve as a unified access point for orchestration requests including VM-based workloads or container-based workloads.

In some examples, the resources depicted in FIG. 4 may include clusters 410 for the VIM 408 or compute nodes 422 for the container management platform 420. The clusters 410 of the VIM 408 may include representative cluster A 411 and cluster B 412. The compute nodes in the container management platform 420 may be referred to as a pod, such as example pod A 423 and pod B 424.

The MANO 402 may generate a request including a workload to create a VNF, and this VNF may include a master VNF and subordinates of the master VNF. When the request is transmitted from the MANO 402 to the VIM 408, the policy and mediation engine 406 may perform a classification of the request. The policy and mediation engine 406 may perform the classification to ascertain whether the request has to be processed using a VM or using a container. Further, if the workload includes a multi-part VNF, the policy and mediation engine 406 may identify which part of the multi-part VNF should be implemented using a VM and which part of the multi-part VNF should be implemented using a container.

For workloads that are to be implemented using VMs, the policy and mediation engine 406 may determine that the workload be formed as part of the VM and be instantiated locally. For workloads that are to be implemented using containers, the policy and mediation engine 406 may use an API or a direct connection to the container management platform 420 to instantiate the workloads on containers. The policy and mediation engine 406 may transmit a request to the container management platform 420 describing particular workloads that the container management platform 420 may instantiate on the containers. The policy and mediation engine 406 may further transmit the corresponding resource requirements for the workloads to the container management platform 420. For example, the policy and mediation engine 406 may communicate information that for a given workload, the resource requirement may include a compute requirement, a storage requirement, and the like. The container management platform 420 can create the workflows on an appropriate pod based on the received information. The container management platform 420 may then make an association between different VNFs represented in the workload request. The association can indicate that the multiple containers or multiple subsets of a given VNF are part of a common service mesh or service function.

The policy and mediation engine 406 may then transmit a message back to the VIM 408 indicative that the policy and mediation engine 406 has created the workload. The message may further include information such as a cluster or pod location associated with the workload or VNF, an IP address, a MAC address, a logical port, and the like. The VIM 408 may update a state machine 414 to reflect the workloads that are instantiated locally on the clusters 410 versus the workloads that are instantiated on pods 422 using the the container management platform 420.

As noted, the policy and mediation engine 406 may be embedded within the VIM 408. The policy and mediation engine 406 may represent a separate function at least because VIM platforms may not be proprietary. VIM platforms may include APIs 405 and the VIM 408 and the policy and mediation engine 406 may transmit requests through each the APIs 405. For example, to create a virtual network, the VIM 408 may use a network API. As another example, to create compute request, the policy and mediation engine 406 may send a request through a compute API. The disclosed systems may perform orchestration across emerging network services at a virtual level and may perform this orchestration automatically. The policy and mediation layer 406 may use the APIs 405 to intercept requirements that come from a orchestration platform (for example, the NFV MANO 402) or any other suitable platform. The policy and mediation layer 406 may communicate with a VNF workload state machine 414 that creates a unified view of a network service rather than creating disjoint workloads. The policy and mediation layer 406 may represent a software module that sits below the APIs 405 and can intercept the different API calls to perform appropriate functions as described above.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as example only, with a true scope and spirit of the disclosure being indicated by the following claims.

What is claimed is:

1. A system for managing an integrated network comprising a physical network and a virtual network, comprising:
   a non-transitory, computer-readable medium containing instructions; and
   a processor that executes the instructions to perform stages comprising:
      identifying, by a virtual infrastructure manager ("VIM"), a virtual network function ("VNF") descriptor from information obtained from the integrated network;
      selectively generating at least one container based on the VNF descriptor;
      determining, by the VIM, an integrated network requirement based on state information associated with the integrated network;
      providing, by the VIM, to a container management platform, the integrated network requirement; and
      generating a multi-part VNF that includes first and second VNFs, wherein the first VNF includes at least one microservice generated in the container to fulfill the integrated network requirement, and wherein the second VNF includes a virtual machine ("VM") that is not in the container.

2. The system of claim 1, wherein the the stages further: second VNF comprising the VM is generated on the multi-part VNF based on the VNF descriptor to fulfill the integrated network requirement.

3. The system of claim 1, the stages further comprising generating, by the container management platform, the at least one microservice based on an occurrence of a predetermined event defined by the VNF descriptor.

4. The system of claim 1, wherein generating the multi-part VNF includes determining at least one of a VNF placement, an addition of other VNFs, and a VNF teardown.

5. The system of claim 1, wherein the VIM comprises an application programming interface ("API") configured to receive an integrated network service request, and wherein the stages further comprise determining, by the VIM, the integrated network requirement based on the integrated network service request.

6. The system of claim 1, the stages further comprising identifying and storing, by the VIM, data describing at least one of a VNF location on the integrated network or a VNF resource consumption on the integrated network.

7. The system of claim 1, the stages further comprising implementing, by the VIM, a policy defined by the VNF descriptor, the VNF descriptor comprising at least one of a virtual VNF link descriptor ("VVLD"), a virtual network function descriptor ("VNFD"), or a physical network function descriptor ("PNFD").

8. A method for managing an integrated network comprising a physical network and a virtual network, comprising:
   identifying, by a VIM, a VNF descriptor from information obtained from the integrated network;
   selectively generating at least one container on the physical network based on the VNF descriptor;
   determining, by the VIM, an integrated network requirement based on state information associated with the integrated network;
   providing, by the VIM, to a container management platform, the integrated network requirement; and
   generating a multi-part VNF that includes first and second VNFs, wherein the first VNF includes at least one microservice generated in the container to fulfill the integrated network requirement, and wherein the second VNF includes a virtual machine ("VM") that is not in the container.

9. The method of claim 8, wherein the further:
   second VNF comprising the VM is generated on the multi-part VNF based on the VNF descriptor to fulfill the integrated network requirement.

10. The method of claim 8, further comprising generating, by the container management platform, the at least one microservice based on an occurrence of a predetermined event defined by the VNF descriptor.

11. The method of claim 8, wherein generating the multi-part VNF includes determining at least one of a VNF placement, an addition of other VNFs, and a VNF teardown.

12. The method of claim 8, wherein the VIM comprises an API configured to receive an integrated network service request, and wherein the stages further comprise determining, by the VIM, the integrated network requirement based on the integrated network service request.

13. The method of claim 8, the method further comprising identifying and storing, by the VIM, data describing at least one of a VNF location on the integrated network or a VNF resource consumption on the integrated network.

14. The method of claim 8, the method further comprising implementing, by the VIM, a policy defined by the VNF descriptor, the VNF descriptor comprising at least one of a VVLD, a VNFD, or a PNFD.

15. A non-transitory, computer-readable medium comprising instructions that, when executed by a processor, perform stages for managing an integrated network comprising a physical network and a virtual network, the stages comprising:
   a non-transitory, computer-readable medium containing instructions; and
   a processor that executes the instructions to perform stages comprising:
      identifying, by a VIM, a VNF descriptor from information obtained from the integrated network;
      selectively generating at least one container on the physical network based on the VNF descriptor;
      determining, by the VIM, an integrated network requirement based on state information associated with the integrated network;
      providing, by the VIM, to a container management platform, the integrated network requirement; and
      generating a multi-part VNF that includes first and second VNFs, wherein the first VNF includes at least one microservice generated in the container to fulfill the integrated network requirement, and wherein the second VNF includes a virtual machine ("VM") that is not in the container.

16. The non-transitory, computer-readable medium of claim 15, wherein the:
   second VNF comprising the VM is generated on the multi-part VNF based on the VNF descriptor to fulfill the integrated network requirement.

17. The non-transitory, computer-readable medium of claim 15, the stages further comprising generating, by the container management platform, the at least one microservice based on an occurrence of a predetermined event defined by the VNF descriptor.

18. The non-transitory, computer-readable medium of claim 15, wherein the generating the multi-part VNF includes determining at least one of a VNF placement, an addition of other VNFs, and a VNF teardown.

19. The non-transitory, computer-readable medium of claim 15, wherein the VIM comprises an API configured to receive an integrated network service request, and wherein the stages further comprise determining, by the VIM, the integrated network requirement based on the integrated network service request.

20. The non-transitory, computer-readable medium of claim 15, the stages further comprising identifying and storing, by the VIM, data describing at least one of a VNF location on the integrated network or a VNF resource consumption on the integrated network.

* * * * *